United States Patent [19]

Kerr

[11] Patent Number: 4,551,379
[45] Date of Patent: Nov. 5, 1985

[54] INFLATABLE PACKAGING MATERIAL

[76] Inventor: Stanley R. Kerr, Apt. 2201, 355 St. Clair Ave. W., Toronto, Ontario, Canada, M5P 1N5

[21] Appl. No.: 528,004

[22] Filed: Aug. 31, 1983

[51] Int. Cl.[4] .......................... B32B 3/12; B65D 81/02
[52] U.S. Cl. .................................. 428/200; 206/522; 428/166; 428/195
[58] Field of Search .................. 428/68, 76, 166, 178, 428/195, 43, 200; 156/145, 147; 5/455, 456; 206/522

[56] References Cited

U.S. PATENT DOCUMENTS 3,547,751 12/1970 Morgan ............................ 428/188
4,096,306 6/1978 Larson ............................. 428/188
4,247,963 2/1981 Reddi ............................... 156/145
4,465,188 8/1984 Soroka et al. ..................... 206/522

FOREIGN PATENT DOCUMENTS 2391121 1/1979 France ............................. 206/522

Primary Examiner—Paul J. Thibodeau
Attorney, Agent, or Firm—Hirons, Rogers & Scott

[57] ABSTRACT

A packaging material is formed from a pair of juxtaposed sheets. The material includes a plurality of continuous passages formed between the sheets and extending between two of its edges. Each of said passages is delimited by a pair of spaced partitions, at least one of which follows a sinuous path between the edges. The passages are inflatable by admission of air to provide a shock absorbing facility.

20 Claims, 21 Drawing Figures

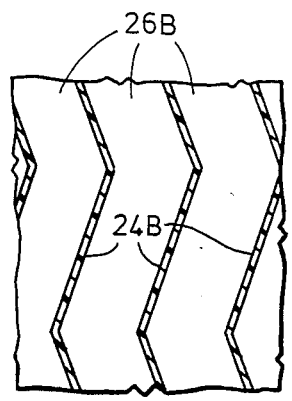
FIG. 5
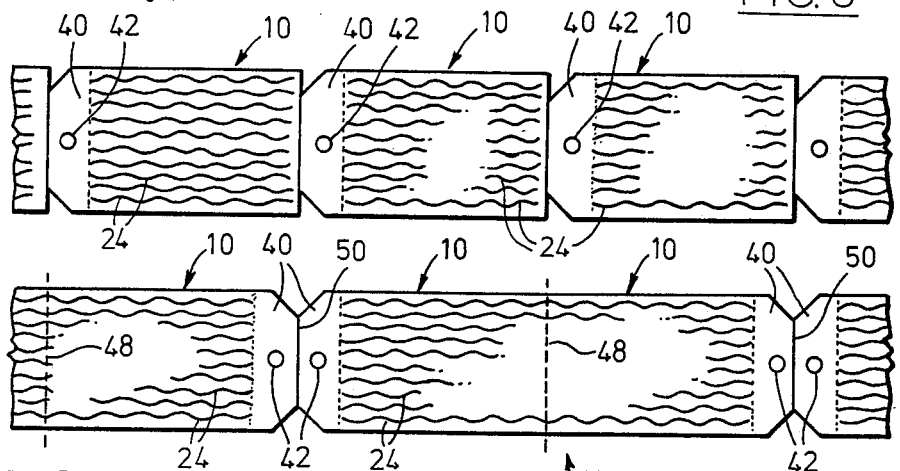
FIG. 6
FIG. 7
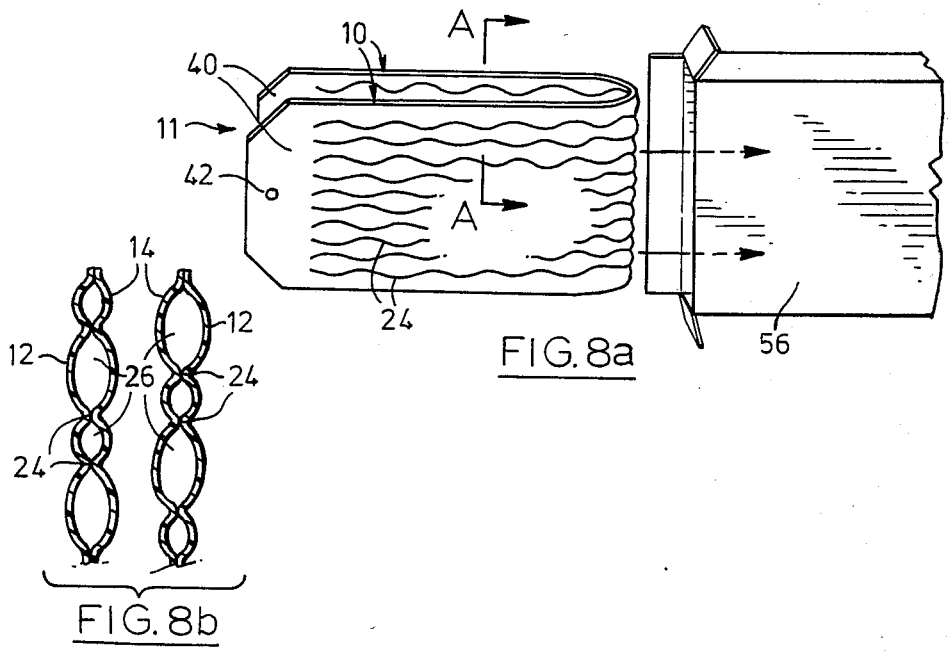
FIG. 8a
FIG. 8b

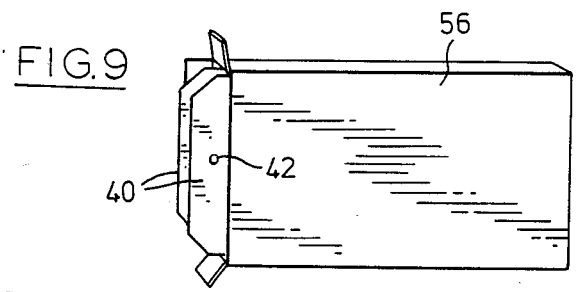
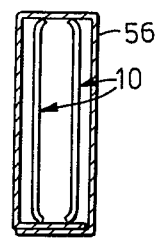
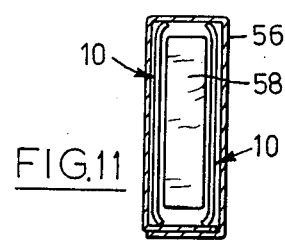
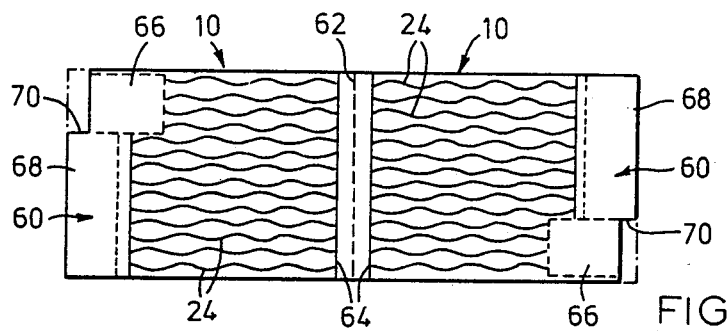
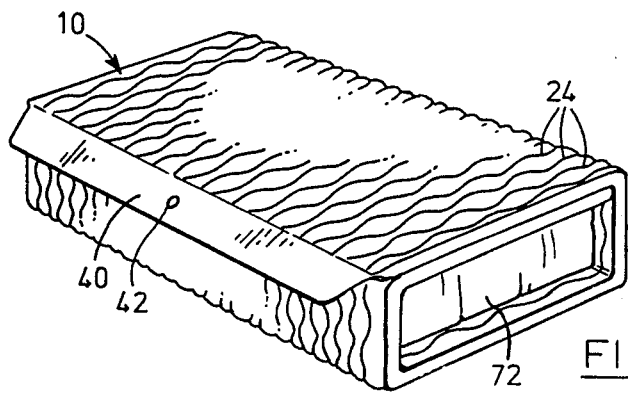

INFLATABLE PACKAGING MATERIAL

The present invention relates to packaging material for use in protecting articles during transport.

It is usual to provide some form of protective cushioning material around delicate objects to be transported. Usually this is done by providing a box in which the object is placed and to provide a packaging material between the object and the box in order to support it. Such an arrangement is generally satisfactory where large numbers of the same object are to be transported permitting the necessary boxes and packaging material to be custom made. However where it is desirable to transport an article in a more conventional container it is usually not feasible to utilise customised packaging material.

Attempts have been made to provide packaging materials which offer some degree of shock resistance to the objects enclosed within them. It has, for example, been proposed to utilise envelopes in which kapok or similar fibrous materials is enclosed between two layers of the envelope so that the walls of the envelope are reasonably well cushioned. More recently it has been proposed to utilise a laminated plastic paper material in which bubbles are formed in the plastic to provide discrete pockets of air and provide a cushioning material. Whilst such arrangements are convenient, they have not always offered a degree of shock resistance necessary.

With the bubble pack arrangement the loads imposed are taken by individual bubbles so that any load imposed on the bubble will also be imposed on the object. Moreover should the load imposed on the bubble exceed the design level, the bubble will tend to burst and and leave the object unprotected. The ability of the bubble to accommodate loads is obviously determined by the volume of air trapped within the bubble so that as the bubble is deformed the pressure increases, tending to burst that bubble.

It is therefore an object of the present invention to obviate or mitigate the above disadvantages.

In general terms the present invention provides a packaging material that is inflatable. Passages are formed between juxtaposed sheets with adjacent passages being separated by partitions. In one aspect of the invention the partitions are generally sinuous so that a plurality of restrictions are performed along the length of the passage to restrict the flow of air. In another aspect to the invention discontinuities are formed in the partitions to allow restrictive air flow from one passage to another. The packaging material may also be formed as a series of interconnected panels to form a blank that may be inserted into a carton.

Embodiments to the invention will now be described by way of example only with reference to the accompanying drawings in which, FIG. 1 shows a portion of a sheet of packaging material in a deflated condition.

Figure 3:
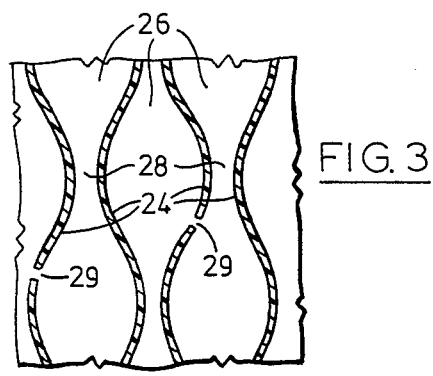
FIG. 3 is a view on the line 3—3 of FIG. 2.

FIG. 5 is a view similar to FIG. 3 showing a further alternative form of packaging material, FIG. 6 is a view of a portion of a roll of material showing how individual elements of packaging material may be formed in seriatim, FIG. 7 is an alternative arrangement for forming the elements shown in FIG. 6 in seriatim, FIG. 8a shows a packaging material of FIG. 7 arranged for use with a conventional envelope, FIG. 8b is a section along the line a—a of FIG. 8a, FIGS. 9 through 12 show the steps of inserting the packaging material of FIG. 7 in the envelope, FIG. 13 shows a further alternative form of the packaging material.

Figure 1:
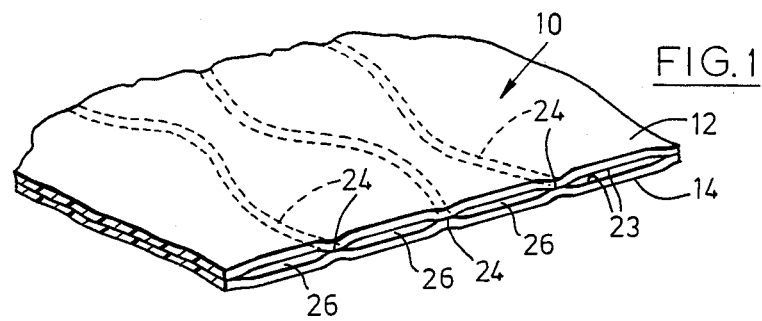
Figure 15:
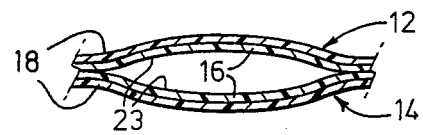
Figure 16:
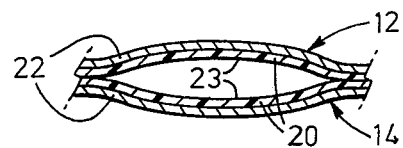
Figure 17:
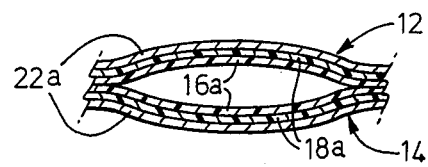

FIG. 14 shows the packaging material of FIG. 6 wrapped around an object to be transported, FIGS. 15 through 17 show cross-sections of the packaging material of FIG. 1 showing alternative forms of construction.

Figure 18:
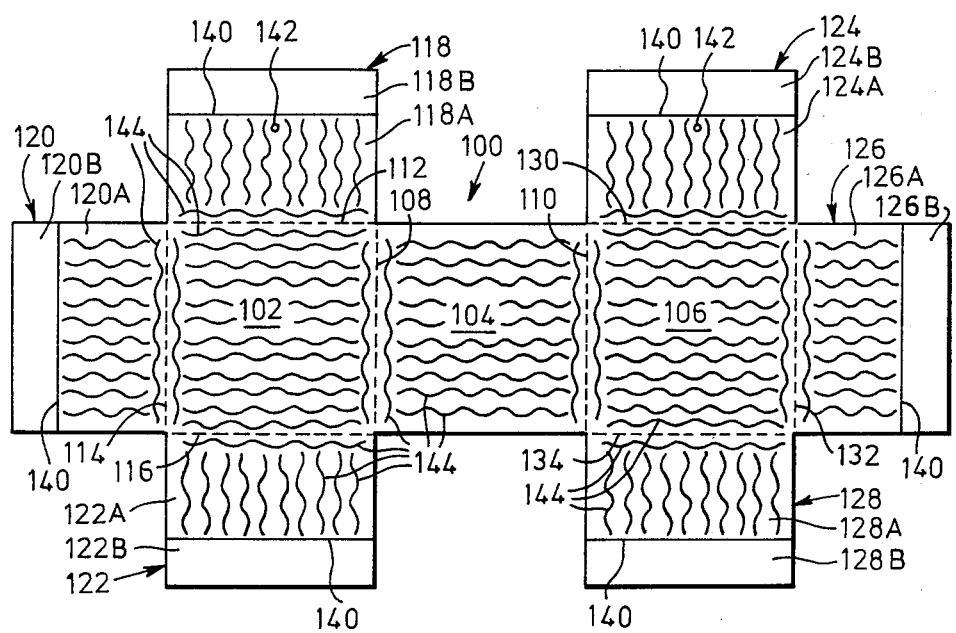

FIG. 18 shows a packaging material formed as a blank to line a box or carton.

Referring now to the drawings and in particular FIG. 1 a packaging material generally designated 10 is formed from two sheets 12–14 of similar air impermeable material. In this preferred embodiment each sheet is in fact a laminate formed from a plurality of different materials that will be described more fully in FIGS. 15 through 17. In the embodiment of FIG. 15 each of the sheets 12–14 is formed from an inner layer of low density polyethylene designated 16, typically 0.0025 inches thick, and is laminated to an outer coating of nylon designated 18 typically 0.001 inches thick. In the embodiment of FIG. 16 each of the sheets 12–14 is formed from a lamination of low density polyethylene designated 20 and Kraft paper designated 22. In the embodiment of FIG. 17 each of the sheets 12–14 is formed from an inner layer of low density polyethylene 16b, an intermediate layer of nylon 18b and an outer layer of kraft paper 20b. In each of the three embodiments of the material shown it will be observed that the innermost layer of each of the sheets 12–14 is formed from low density polyethylene so that an inwardly facing surface 22 of each of the sheets 12–14 is formed from a heat sealable material.

Of course other materials could be used, such as polyester, in the manufacture of the packaging material and if desired additional laminations of cushioning material could be secured to the outer surfaces.

The packaging material 10 is formed from placing the surfaces 22 of the sheets 12–14 against one another and heat sealing the surfaces 22 to one another at spaced intervals across the width of the sheet 12–14 to define partitions designated 24 (FIG. 1). Between the partitions 24, the surfaces 22 are not connected so that the partitions 24 define passageways 26 through the packaging material. The partitions 24 each define a sinuous path designated by dotted lines in FIG. 1 that are complementary in shape. In the preferred embodiment illustration in FIG. 1 the passages 24 define a generally sinusoidal path along the sheet so that the passages 24 alternatively converge and diverge. Thus at spaced intervals along the length of each passage 26 localised constriction as indicated at 28 in FIG. 3 are defined. Discontinuities 29 are provided at selected locations in each of the partitions 24 to provide limited communication between adjacent passages.

The sheets 12, 14 are formed as continuous webs or as individual sheets and the packaging material 10 is formed by sealing the webs or sheets of material 12, 14 by any conventional sealing technique that will impart the desired sinuous path for the passages 24 to form a sheet of packaging material. The packaging material may be cut to the desired length and sealed at one end by a heat sealing tool which presses the surfaces 22 together as they are heated to melting temperature. The cutting and heat sealing can, if desired, be completed at the same time by a combined tool. The packaging material is then inflated to the condition shown in FIG. 2 by the insertion of a suitable manifold 30 shown schematically in FIG. 2. The manifold 30 is connected to a source of pressurised air and can carry a number of nozzles 32 that correspond in spacing and number to the number of passages 26. The nozzles 32 are inserted into the passages 26 between the inner surfaces 22 and air supplied to inflate each of the passages. Whilst inflation is maintained the passages are sealed by a heat sealing bar(not shown) which traps air within the passage 26 to provide the desired inflated packaging material.

The packaging material 10 may then be inserted into envelopes or wrapped around objects to be transported prior to insertion into a shipping container to provide improved shock resistance. Because the packages 26 are continuous from one edge of the sheet to another it is possible for the air trapped within a passage to be displaced along the passage. This provides an improved shock capacity for the material as it effectively distributes the load through a larger volume of air than is usual with bubble packs. The localised restrictions 28 act as damping orifices to control the flow of air along each of the passages 26 to provide a progressive flow of air from an area of shock. Moreover the sinuous nature of the partitions 24 assist in distribution of a load between more than one passage and thereby increases the shock handling capacity because a straight edge of the packaged product will intersect more than one of the passages. The discontinuities 29 also permit air to flow from the loaded passage into adjacent passages and thereby provide increased load carrying capacity.

Figure 4A:
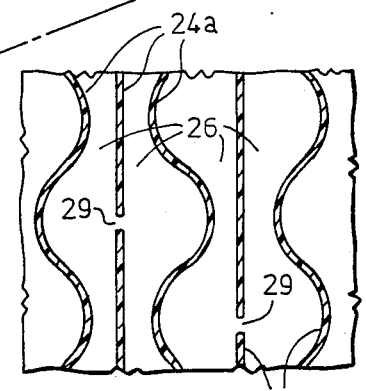
FIG. 4a is a view similar to FIG. 3 but showing an alternative form of packaging material.
Figure 4B:
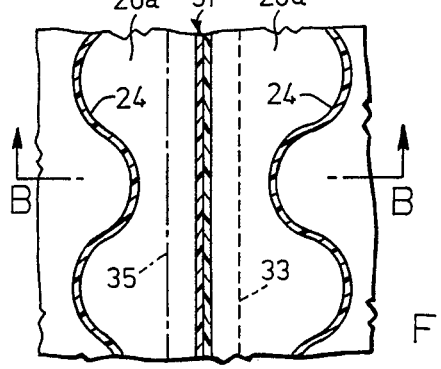
FIG. 4b is a view similar to to FIG. 4a modified to accommodate lateral displacement of the sheet material.
Figure 4C:
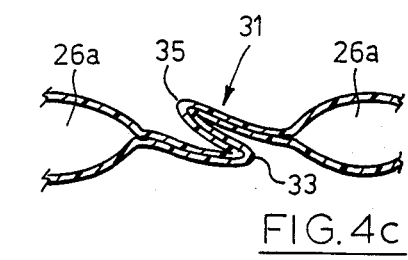
FIG. 4c is a view on the line B—B of FIG. 4b.

FIGS. 4 and 5 show alternative forms of disposition of the partitions 24 and like reference numerals will be used to denote like parts with a suffix a and b respectively added for clarity of description. In the embodiment of FIG. 4a one of the partitions 24a is formed generally sinusoidally and the adjacent partition 24a is formed as a straight line. However the two adjacent partitions 24a still cooperate to define alternate localised restrictions 28a along the length of the passage 26a.

The embodiment of FIG. 4b is modified to provide expansion zones 31 between sets of passages 26a. The expansion zones are formed by sheet material folded back on itself along lines 33,35 so that as the material 10 is inflated, the lateral movement induced by inflation is accommodated by the zone 31 unfolding about the lines 33, 35.

In the embodiment of FIG. 5 the partitions 24b are complementary in shape and are generally zig zag. In this arrangement the localised restrictions 28 are not present but the continuous reversal of direction of air flow along the passage 26b acts to damp the flow of air along the passage.

Figure 2:
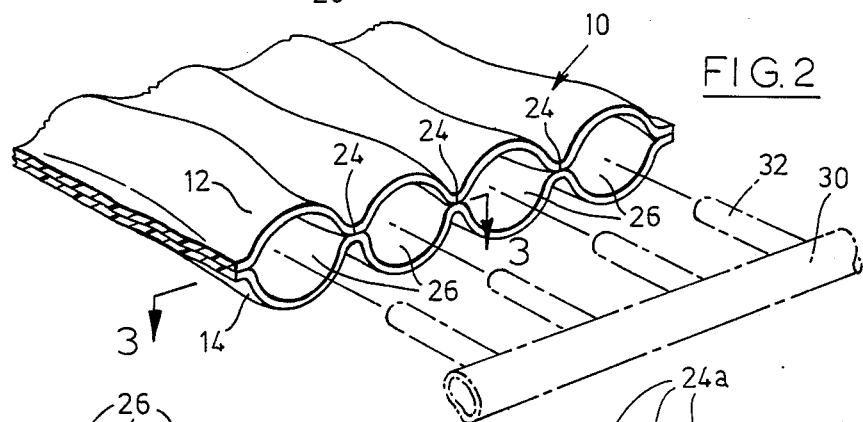
FIG. 2 shows the packaging material of FIG. 1 in an inflated condition.

Whilst the inflation arrangement described with respect to FIG. 2 is suitable for mass production techniques it may be preferable to facilitate inflation of the packaging material 10 after dispatch from its place of manufacture. A suitable arrangement is shown in FIG. 6 in which a manifold 40 is formed at one end of the sheet of packaging material 10. The manifold 40 is defined by the two layers of material 12, 14 heat sealed along these edges to provide an enclosed volume. A valve assembly 42 is mounted on the manifold 40 to control the flow of air between the interior and exterior of the packaging material. The valve 42 may be of any convenient form that permits the material to be inflated and deflated as desired. In this manner a simple integral valve arrangement is provided so that the packaging material may be used at any convenient location and subsequently deflated for storage.

Increased versatility may be obtained by arranging the packaging material shown in FIG. 6 on a web as shown in FIG. 7. In this arrangement the continuous web is segregated into alternating manifolds 40 and packaging panels 11. The packaging panel 11 is separated into two individual areas 10 by a sealing zone 48 and the manifold panel is divided into two separate manifolds by a sealing zone 50. The packaging material is separated from the web by cutting along the sealing zones 48–50 to form a generally rectangular panel of packaging material 10 and an integral manifold 40. The valve 42 may be inserted in the manifold 40 either prior to or after the separation from the web.

The web shown in FIG. 7 is also useful for providing packaging material suitable for cushioning on both sides of an object when inserted into a container. This arrangement is shown in FIG. 8 in which it will be observed that the packaging material is not cut along the sealing zone 48 but is folded along that line to provide two areas of packaging material 10 and two integral manifolds 40. The material 10 is arranged to be inserted into a container 56 in a deflated condition to lie along both sides of the container. This condition is shown in FIG. 10 where it will be seen that an object indicated at 58 may then be inserted into the container between the two panels of packaging material 10 and the packaging material subsequently inflated as shown in FIG. 12 to provide a cushioned environment for the object 58. After inflation the manifolds 40 will be tucked around the end of the object providing further retention and cushioning for it.

With the embodiment shown in FIG. 8a it may be preferred that the partitions 24 are arranged on successive panels so that they are staggered to one another on opposite sides of the article in the manner shown in FIG. 8b. In this way improved cushioning of the article within the envelope is obtained.

The packaging material 10 may also be formed as a continuous web including an integral sealing flap. This arrangement is shown in FIG. 13 where the web is formed with a pair of panels 10 of packaging material and a generally rectangular panel 60 at each end. The packaging material is separated by a fold zone 62 defined by a pair of spaced sealed strips 64. The rectangular zone is divided into a manifold 66 to carry a valve assembly and a sealing flap 68 by means of a heat sealed zone 70 which is subsequently cut from the edge partially along its length. The arrangement shown in FIG. 13 may be used in a manner similar to that shown in FIGS. 10 through 12 to accommodate an object within a container. In the arrangement of FIG. 14 it will be observed that the packaging material 10 such as that shown in FIG. 6 is wound around the object 72 and the manifold 40 used to secure packaging material 10 on one side. With this arrangement the material may either be wrapped around the object prior to inflation or may be wrapped after inflation whichever is more convenient.

In both cases however the valve member 42 and manifold 40 is accessible from one edge of the material.

It will be observed therefore in all the above arrangements that a simple robust packaging material is provided which is extremely versatile and which may be used in a number of ways to provide improved shock absorbency in the transport of different objects. The material may be made in web form and cut to any desired length or manufactured to suit a particular situation. For example, a length of the material may be used to line four sides of a box, as a divider in a carton, or as pads at the top and bottom of a carton. The material may be used either to line an existing container or as a self contained packaging material that may be used as the outer covering of an article during transport.

In the embodiment of FIG. 18 the packaging material 10 is made as a blank to fit within a conventional carton or box. The blank 100 is formed from three panels 102, 104, 106 connected in seriatim along fold lines 108, 110 respectively.

The panels 102, 104, 106 provide three side panels of a conventional cubic box.

Extending from edges 112, 114, 116 of panel 102 are panels 118, 120 and 122 respectively. Each of the panels 118, 120, 122 extends the full width of the panel 102 but has only approximately ¾ of the height of that panel.

Similarly panels 124, 126, 128 extend around the edges 130, 132, 134 of panel 106.

Each of the panels 118, 120, 122 and 124, 126, 128 are formed as two zones which are separated by a heat sealed line 140. The line 140 is located on each panel so as to sub-divide the panel into an inflatable zone designated by suffix A and a non-inflatable zone designated by suffix B. The line is positioned such that the inflatable zone (118A typically) extends approximately half the width of the panel 104 so that the non-inflatable zone 118B will overlap the inflatable zone 124A of panel 124. A pair of valve assemblies 142 are located in each of the panels 118a and 124a to permit inflation of the packaging material.

Each panel of the packaging material 100 is divided by sinuous partitions 144 formed in the manner described above with reference to FIGS. 1 through 3. The partitions 144 are arranged such that they extend along each of the fold lines segregating the panels 102, 104, 106, 118, 120, 122, 124, 126 and 128. Thus it can be seen with reference to for example panel 102, that the majority of the partitions 144 lie generally parallel to the fold line interconnecting the panel 118 with the panel 102. However, along the fold line between panels 102, 104 and between panel 118 and 120, the partitions 144 are oriented so that they lie parallel with those fold lines. None of the partitions 144 intersect with another partition 144 so that there is free space between each of the partitions to permit the ingress and egress of air.

The blank 100 is utilized within a carton by firstly erecting the carton and then inserting the blank 100 such that the panels 102, 104, 106 lie alongside three of the vertical sides. In this position the panels 122 and 128 each cover ¾ of the base with the non-inflatable zones 122B overlapping the inflatable zone 134A and vice versa. Similarly the panels 120 and 132 cover the four sides of the carton and the panels 118A and 124 are available to cover the top surface of the carton. The article to be packaged is then inserted into the carton within the blank 100 and air admitted through the valves 142 to inflate the packaging material to the desired pressure to hold the article firmly within the carton. The carton may then be sealed with the article protected on all four sides by the blank 100.

After transportation the blank 100 may be simply deflated, the article removed and the blank removed for future use if desired. In this way a blank suitable for use in all standard size cartons can be provided that is reusable and is available to closely pack around the article located within the carton.

The embodiments of the invention in which an exclusive property or privilege is claimed are defined as follows:

1. A packaging material formed from a pair of juxtaposed sheets, said material including a plurality of continuous passages formed between said sheets and extending between two edges thereof, said passages being inflatable by admission of air and sealing of each passageway to provide a shock absorbing facility, adjacent passages being separated by partitions extending between said edges and having a substantially uniform thickness at least one partition of each passage following a sinuous path between said edges, each of said one partitions having a line of symmetry that extends across portions of adjacent ones of said passages whereby an object supported on a marginal portion of one passage adjacent said one partition will also be supported on a marginal portion of an adjacent passage and the spacing between the partitions delimiting each passage varying between the two edges of said sheet to provide a plurality of reductions in the cross sectional area of said passage spaced apart along the passage whereby air displaced from one end of said passage to the other is subjected to successive restrictions to the flow of air.

2. A packaging material according to claim 1 wherein both partitions of each passage are sinuous.

3. A packaging material according to claim 2 wherein said partitions are defined by contiguous portions of said sheets.

4. A packaging material according to claim 2 wherein the paths of each partition are allochiral.

5. A packaging material according to claim 4 wherein the path of each partition is sinusoidal.

6. A packaging material according to claim 2 wherein said juxtaposed sheets are formed from heat sealable material and said partitions are defined by heat sealing contiguous portions of said sheets along said path.

7. A packaging material according to claim 6 wherein said passages are terminated at each edge by heat sealing said sheets to one another at said edge.

8. A packaging material according to claim 7 wherein said sealed edges separate said passages from one another to provide a plurality of discrete passages.

9. A packaging material according to claim 1 including a manifold along one of said edges in communication with said passages, said manifold having an inlet to permit ingress of air to each of said passages simultaneously.

10. A packaging material according to claim 1 wherein discontinuities are provided in at least one partition of one of the passages to permit restricted transfer of air between adjacent packages.

11. A packaging material formed from a pair of juxtaposed sheets, said material including a plurality of continuous passages formed between said sheets and extending between two edges thereof, each of said passages being sealed at opposite ends and inflatable by admission of air to provide a shock absorbing facility, said passages being divided into a plurality of sets of passages with an expansion zone between each set to accommodate relative lateral displacement of said sets upon inflation of said passages, said expansion zone comprising non inflated portion of said material having a pair of parallel fold lines extending generally parallel to said passages, said portion being folded back on itself about each fold lines and being unfolded upon lateral displacement of adjacent sets of passages.

12. An inflatable packaging material formed from a plurality of juxtaposed sheets sealed to one another along a pair of opposite edges, said material including a plurality of passages extending generally parallel to said opposite edges and sealed at each end with adjacent passages being separated by a partition, said partitions being configured to provide a restriction to the flow of air along said passage and discontinuities being provided in one partition of at least one of said passages to allow restricted flow of air between adjacent passages.

13. An inflatable packaging material according to claim 12 wherein at least one partition of each passageway is sinuous.

14. An inflatable packaging material according to claim 13 wherein both partitions are sinuous and are symmetrical about the longitudinal axis of said passage.

15. An inflatable packaging material for location within a carton said material comprising a first inflatable panel to overlie one panel of said carton, a second inflatable panel extending from one edge of said first panel and a third inflatable panel extending from a second edge of said first panel adjacent to said first edge, each of said panels being formed from a pair of juxtaposed sheets of air impervious material sealed to one another along contiguous edges, each panel including a plurality of continuous partitions extending between opposed edges of respective panels to define a plurality of continuous passages in each panel the partitions of said second panel adjacent to said first edge being generally parallel to said first edge and the partitions in said third panel adjacent to said second edge being generally parallel to said second edge whereby folding off said second and third panels relative to said first panel is facilitated.

16. A packaging material according to claim 15 wherein said partitions are sinuous.

17. A packaging material according to claim 15 wherein panels extend to either side of at least one of said panels arranged in seriatim.

18. An inflatable material according to claim 16 wherein partitions of said first panel adjacent to the edges thereof lie parallel thereto.

19. An inflatable packaging material according to claim 15 wherein a plurality of panels are connected in seriatium to said first panel at an edge opposite to said first edge.

20. An inflatable packaging material according to claim 19 wherein a further panel is connected to said first panel on an edge opposite to said second edge.

* * * * *